No. 679,166. Patented July 23, 1901.
O. H. P. CORNELL.
MACHINE FOR CUTTING OFF AND CROZING BARREL STAVES.
(Application filed Dec. 6, 1900.)
(No Model.) 3 Sheets—Sheet 1.
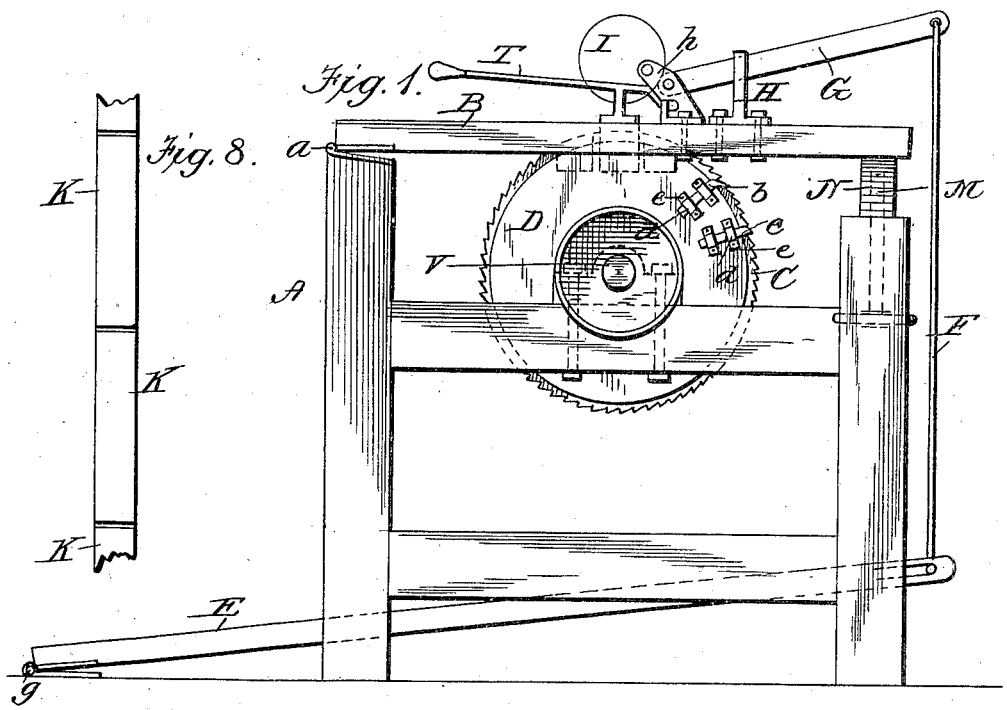
Fig. 1.
Fig. 8.
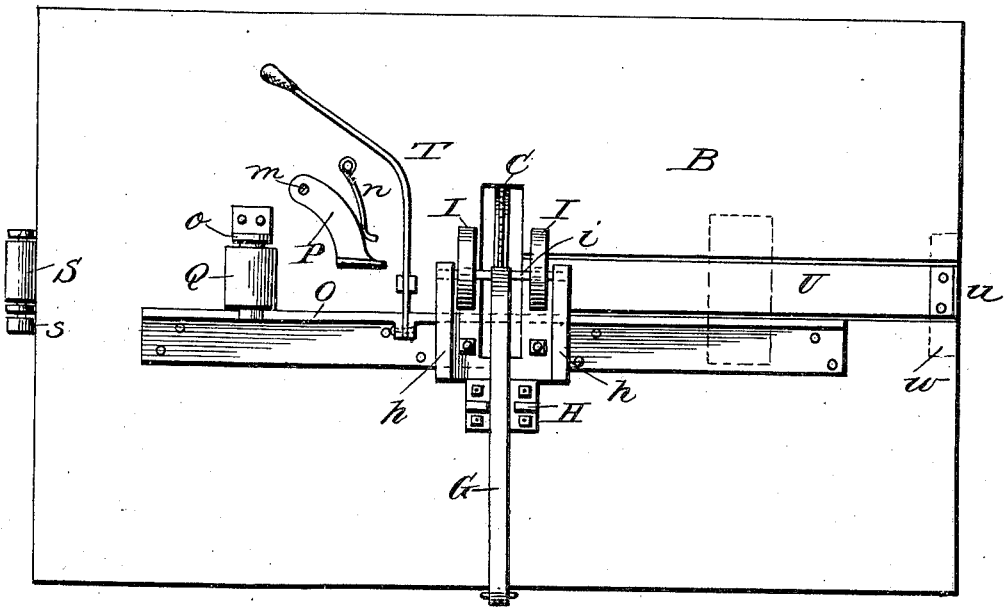
Fig. 2.
Witnesses
Franck L. Ouraud
W. Parker Reinohl
Inventor
Oliver H. P. Cornell
By D. L. Reinohl
Attorney No. 679,166. Patented July 23, 1901.
O. H. P. CORNELL.
MACHINE FOR CUTTING OFF AND CROZING BARREL STAVES.
(Application filed Dec. 6, 1900.)
(No Model.) 3 Sheets—Sheet 2.
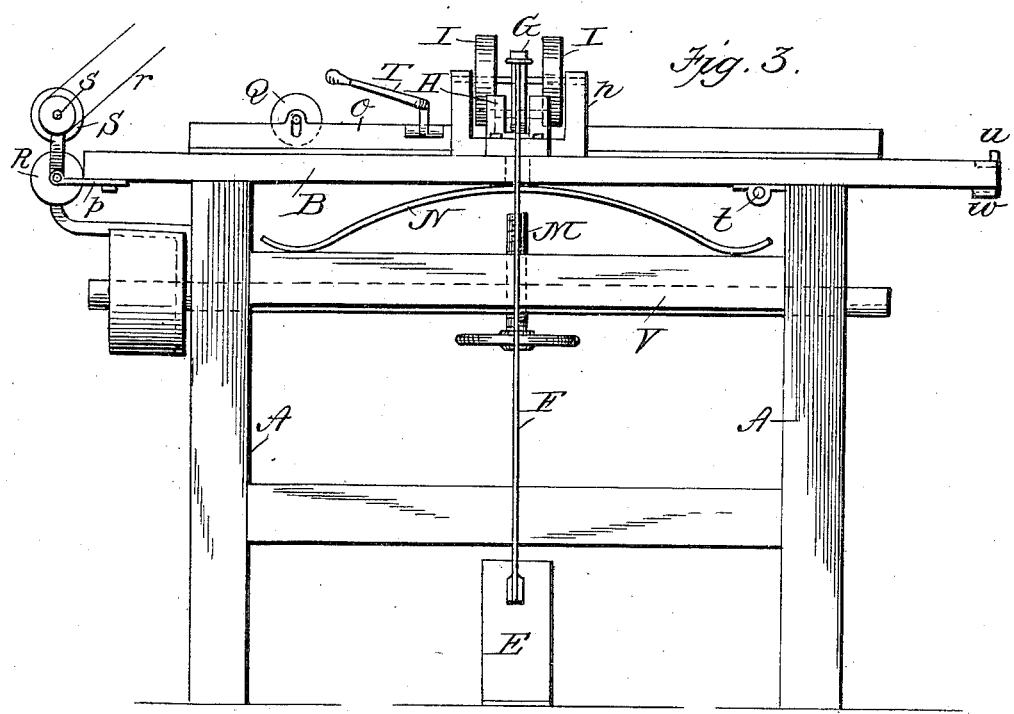
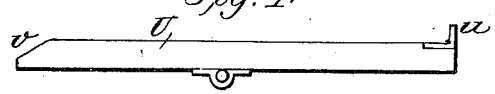
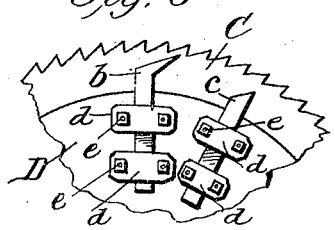
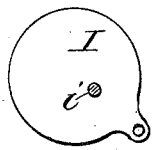
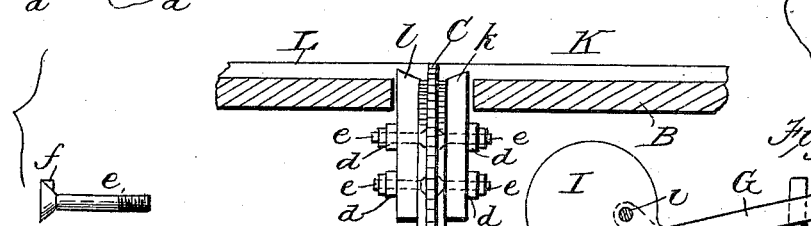
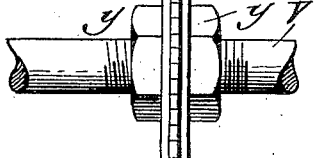
Witnesses
Franck L. Orrand
W. Parker Reinohl
Inventor
Oliver H. P. Cornell
By D. P. Reinohl
Attorney
THE NORRIS PETERS CO., PHOTO-LITHO., WASHINGTON, D. C.

No. 679,166. Patented July 23, 1901.
O. H. P. CORNELL.
MACHINE FOR CUTTING OFF AND CROZING BARREL STAVES.
(Application filed Dec. 6, 1900.)
(No Model.) 3 Sheets—Sheet 3.

Witnesses
Franck L. Ourand
W. Parker Rinold

Inventor
Oliver H. P. Cornell.
By D. L. Rinold
Attorney

UNITED STATES PATENT OFFICE.

OLIVER H. P. CORNELL, OF BROOKLYN, NEW YORK.

MACHINE FOR CUTTING OFF AND CROZING BARREL-STAVES.

SPECIFICATION forming part of Letters Patent No. 679,166, dated July 23, 1901.

Application filed December 6, 1900. Serial No. 38,921. (No model.)

*To all whom it may concern:*

Be it known that I, OLIVER H. P. CORNELL, a citizen of the United States, residing at Brooklyn, in the county of Kings and State of New York, have invented certain new and useful Improvements in Machines for Cutting Off and Crozing Barrel-Staves; and I do hereby declare the following to be a full, clear, and exact description of the invention, such as will enable others skilled in the art to which it appertains to make and use the same.

My invention relates to the art of making barrels, has especial reference to crozing the staves, has for its object the manufacture of staves from strips of wood properly dressed and of sufficient length to make several staves in succession, and consists in certain improvements in construction which will be fully disclosed in the following specification and claims.

The prevailing practice of making staves consists in cutting timber of a length to make one stave, then splitting the timber and steaming it, and then working it into staves, which are then seasoned and subsequently jointed and tied in bundles and shipped to the cooper, who squares the ends and crozes the staves before making a barrel. By this practice the timber must be handled a number of times before a completed stave is produced, which adds materially to the cost of the barrel.

Figure 9:
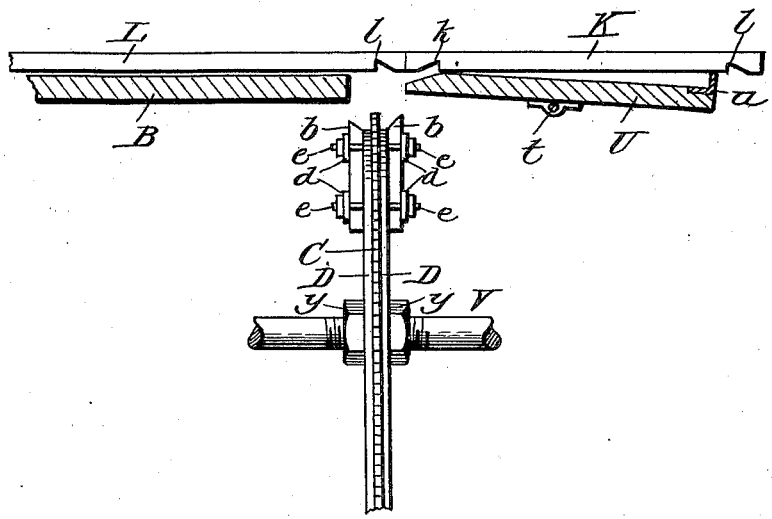
Figure 10:
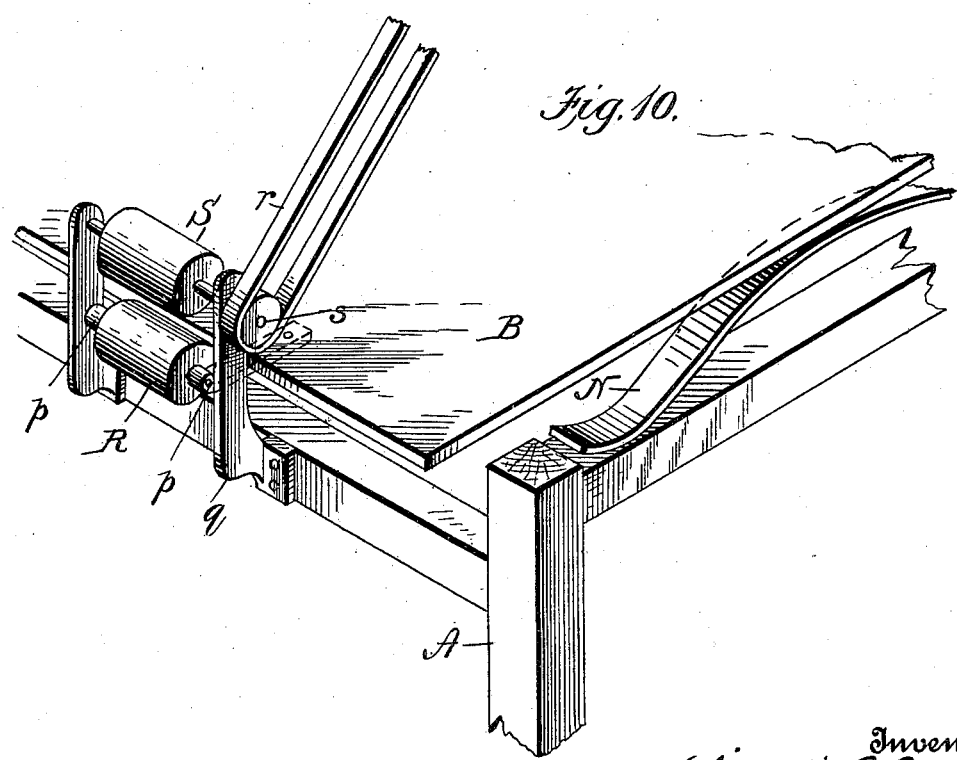

In the accompanying drawings, which form part of this specification, Figure 1 represents an end view of my improved machine, the feed mechanism being omitted to avoid confusion; Fig. 2, a top plan of the same; Fig. 3, a side view showing the rear of the machine; Fig. 4, a side view of the hinged section of the table detached; Fig. 5, a vertical section of the table, the cutting-off tool, and the crozing-tools, and a side elevation of the shaft which supports the tools; Fig. 6, a side elevation of a section of the cutting-off tool and of one of the crozing-tools on an enlarged scale; Fig. 7, a like view of the clamp for holding the strip to the table while it is being cut off and the adjacent ends crozed; Fig. 8, a side view of a strip of wood with lengths of staves indicated thereon; Fig. 9, a vertical longitudinal section through the center of the table, showing a multiple-stave blank severed in the center, the crozes formed and the forward stave extending beyond the outer end of the hinged section of the table, and the cutting-off and crozing tools, the table being hid in its raised position and on an enlarged scale; and Fig. 10, a perspective, on an enlarged scale, showing the stock-feed mechanism.

Reference being had to the drawings and the letters thereon, A indicates the frame of the machine, and B the top of the table, which is secured to the frame by hinges $a\,a$, only one of which is shown in Fig. 1, and is vertically movable to draw the strip down while it is being operated upon by the cutting-off tool C, having a line of cut transverse to the line of feed and the crozing-tools D D, the latter of which is provided with cutters $b\,c$, which are arranged so that $c$ makes an incision severing the grain of the wood in advance of the cutter $b$, which shapes the croze. The cutters are secured to the disks which support them by pieces of metal $d$ and bolts $e$, on whose heads are slight projections $f$ to prevent their turning. The table is depressed by means of a foot-lever E, a rod F, and a lever G, the lever E being secured to the frame A by a hinge $g$, and the lever G is supported on a fulcrum H on the table, the outer end of the lever being connected to eccentrically-mounted clamping-disks I I, supported in a frame or bracket $h$ by the lever engaging a transverse bar $i$, which is connected at its ends to both of the disks. The disks are separated, so that one will engage the stave K, that has been severed from the strip L just back of the croze $k$, while the other disk engages the strip just back of the croze $l$, and clamp the strip and the stave to the table while the stave is being severed from the strip and the crozes formed in both. By this construction the table and the clamps are moved synchronously by the foot of the operator.

M indicates an adjustable stop to limit the downward motion of the table, and N a spring to raise the table and restore it to its normal position after each operation of the cutting-off tool and the crozing-tools.

O is a fixed guide secured to the top of the table, and P a laterally-yielding guide pivotally secured to the table at $m$ and held in engagement with the strip L by a spring $n$.

Q is a roller one end of which is supported in the guide O, and the opposite end is supported in a bracket o and is arranged above the table a distance equal to the thickness of the strip L to prevent its tilting at the rear end as it is being fed into the machine.

R indicates the lower roller of an automatic feed to move the strip along on the table and is supported on a bracket p, secured to the top B of the table, as shown in Fig. 3, so that it rises and falls with the top to engage the strip, and S the upper roller, supported on a bracket q, secured to the frame A, and is driven by a belt r, engaging a pulley s on the shaft of the roller. As the table-top rises the pulley R rises and presses the strip L against the roller S. The latter feeds the strip to the cutting-tools, and when the table-top is depressed to cut and croze the staves the strip is released from the feed during the cutting action.

T indicates a lever-clamp to hold the strip while the end is being cut off and the croze cut in the end of the first stave cut from the strip.

U indicates a section of the table-top B, pivotally connected to the under side of the table at t in rear of its longitudinal center, as shown in Fig. 2, narrower than the stave, and is provided at its outer end with a stop u, which is engaged by the front end of the strip before the stave is severed from it.

The pivoting of the section of the table, as described, and the weight of the stop cause the section to drop or fall at its front end and allow the severed stave to pass on over the table without coming in contact with the stop, and the rear end of the section is beveled on its upper surface at v to enable the oncoming strip to ride over the section without striking said inner end. The degree or extent of the drop of the front of the section U is limited by a support w, secured to the lower side of the table.

The cutting-off tool C, which is a circular saw, and the crozing-tools D D are supported upon the main driving-shaft V of the machine and are secured by nuts y y in the usual way of securing such tools.

Having thus fully described my invention, what I claim is—

1. A machine for making staves from a multiple-stave-length blank provided with a vertically-movable table, means for depressing the table, and means for returning the table; in combination with a feed mechanism, a cutting-off tool having a line of cut transverse to the line of feed, and crozing-tools on opposite sides and adjacent to the cutting-off tool.

2. A machine for making staves from a multiple-stave-length blank provided with a table hinged to the frame on one side, a stop and a spring on the opposite side, and means for depressing the table; in combination with a feed mechanism, a cutting-off tool having a line of cut transverse to the line of feed, and crozing-tools on opposite sides, adjacent to the cutting-off tool and supported on the same shaft.

3. A machine for making staves from a multiple-stave-length blank provided with a vertically-movable table, a clamp, means for depressing the table and operating the clamp, and means for returning the table and releasing the clamp; in combination with a feed mechanism, a cutting-off tool having a line of cut transverse to the line of feed, and crozing-tools on opposite sides and adjacent to the cutting-off tool.

4. In a machine for making staves from a multiple-stave-length blank, a vertically-movable table having an end stop mounted on a narrow longitudinal hinged section of said table and in line with the feed, means for feeding the stock endwise, means for depressing the table, and means for returning the table; in combination with a cutting-off tool the line of cut of which is transverse to that of the feed, and crozing-tools on opposite sides and adjacent to the cutting-off tool.

5. A machine for making staves from a multiple-stave-length blank provided with a vertically-movable table, a narrow longitudinal hinged section in said table having a stop at its outer end in the line of the feed and inclined on its upper surface at the opposite end, a clamp, means for feeding the blank endwise, and means for depressing the table and operating the clamp; in combination with a cutting-off tool, the line of cut of which is transverse to the line of feed, and crozing-tools on opposite sides and adjacent to the cutting-off tool.

6. A machine for cutting off and crozing staves, provided with a vertically-movable table, a clamp consisting of an eccentrically-mounted disk, a lever connected thereto and fulcrumed on the table and constructed to depress the table, and means for returning the table; in combination with a cutting-off tool and crozing-tools on opposite sides and adjacent to the cutting-off tool.

7. A machine for making staves from a multiple-stave-length blank provided with a vertically-movable table, a cutting-off tool, and crozing-tools on opposite sides and adjacent to the cutting-off tool; in combination with a feeding device and means for holding the strip to the table before reaching the cutting-off and crozing tools.

8. A machine for making staves from a multiple-stave-length blank provided with a vertically-movable table, a cutting-off tool having a line of cut transverse to the line of feed, and crozing-tools on opposite sides and adjacent to the cutting-off tool; in combination with a feeding device, feeding the blank longitudinally of the table, means for holding the strip to the table while permitting the feed, a fixed and a yielding guide parallel to the line of feed, and a clamp for holding the blank while crozes are being formed and the blank severed.

9. In a machine for making staves from a multiple-stave-length blank, a transversely-arranged cutting-off tool, a table movable vertically to and from said cutting-off tool, a stationary feed device engaging the blank when the table is in its elevated position, and a clamp coöperating with the table on its downward movement to hold the blank while being cut.

10. In a machine for making staves from a multiple-stave-length blank, a transversely-arranged cutting-off tool, a table movable vertically to and from said cutting-off tool, a stationary feed device engaging the blank when the table is in its elevated position, means on the table for holding the blank thereto while permitting the feeding, and a clamp coöperating with the table on its downward movement to hold the blank while being cut.

11. In a machine for making staves from a multiple-stave-length blank, a transversely-arranged cutting-off tool, a table movable vertically to and from said cutting-off tool, a stationary feed device engaging the blank when the table is in its elevated position, means on the table for holding the blank thereto while permitting the feeding, a clamp coöperating with the table on its downward movement to hold the blank while being cut and permitting the feed, a fixed and a yielding guide parallel to the line of feed and a clamp to hold the stock to the table while the stave is being severed from the blank and the crozes formed.

In testimony whereof I affix my signature in presence of two witnesses.

OLIVER H. P. CORNELL.

Witnesses:
ANDERSON PRICE,
NEAL H. EWING.